US008051132B2

(12) United States Patent
Hewes et al.

(10) Patent No.: US 8,051,132 B2
(45) Date of Patent: Nov. 1, 2011

(54) INTEGRATED INTERACTIVE MESSAGING SYSTEM AND METHOD

(75) Inventors: Gerald Hewes, Lexington, MA (US); Eswar Priyadarshan, West Roxbury, MA (US); Boon Hwang, Redmond, WA (US); Srinivasarao Nandiwada, Milford, MA (US)

(73) Assignee: m-Qube, Inc., Watertown, MA (US)

( * ) Notice: Subject to any disclaimer, the term of this patent is extended or adjusted under 35 U.S.C. 154(b) by 1830 days.

(21) Appl. No.: 10/521,507

(22) PCT Filed: Jul. 18, 2003

(86) PCT No.: PCT/US03/23642
§ 371 (c)(1),
(2), (4) Date: Jan. 18, 2005

(87) PCT Pub. No.: WO2004/010593
PCT Pub. Date: Jan. 29, 2004

(65) Prior Publication Data
US 2005/0209861 A1 Sep. 22, 2005

Related U.S. Application Data

(60) Provisional application No. 60/397,402, filed on Jul. 19, 2002.

(51) Int. Cl.
*G06F 15/16* (2006.01)
(52) U.S. Cl. ........................................ 709/206; 709/238
(58) Field of Classification Search .................. 709/206, 709/207, 238; 340/825; 370/351; 705/14
See application file for complete search history.

(56) References Cited

U.S. PATENT DOCUMENTS

| 5,958,006 | A | * | 9/1999 | Eggleston et al. | 709/219 |
|---|---|---|---|---|---|
| 6,101,531 | A | * | 8/2000 | Eggleston et al. | 709/206 |
| 6,205,471 | B1 | * | 3/2001 | Gilchrist et al. | 709/206 |
| 6,336,138 | B1 | * | 1/2002 | Caswell et al. | 709/223 |
| 2001/0034791 | A1 | * | 10/2001 | Clubb et al. | 709/238 |
| 2002/0049815 | A1 | * | 4/2002 | Dattatri | 709/206 |
| 2002/0073158 | A1 | * | 6/2002 | Dalal et al. | 709/206 |
| 2002/0103866 | A1 | * | 8/2002 | Chi et al. | 709/206 |
| 2002/0165923 | A1 | * | 11/2002 | Prince | 709/206 |
| 2004/0059789 | A1 | * | 3/2004 | Shum | 709/206 |
| 2004/0122730 | A1 | * | 6/2004 | Tucciarone et al. | 705/14 |
| 2005/0064850 | A1 | * | 3/2005 | Irlam et al. | 455/414.1 |

* cited by examiner

*Primary Examiner* — Glenton B Burgess
*Assistant Examiner* — Jason Recek
(74) *Attorney, Agent, or Firm* — Arent Fox LLP

(57) ABSTRACT

A system and method for organizations to develop, test, execute and analyze messaging programs defining a message application server comprising (a) a dialog designer configured to provide a user interface to an organization's program designers and marketers, to allow for rapid messaging program creation, to provide the ability to select the type of messaging program, to select service addresses for the messaging program, to schedule messaging programs for execution, to upload messaging user data into lists, to create segments, to download messaging program result data, to test messaging programs, to provide reports, including real-time reports, on messaging programs; (b) a dialog server configured to execute messaging programs by execution of program instructions, to manage substantially simultaneously executed messaging programs, to store messaging user results and message delivery status, to maintain state and session context across message invocations for messaging users within messaging program; and (c) a message exchange configured to route messages to and from messaging service providers, to manage service addresses, to perform message billing and to connect to messaging service providers. The system and method allow organizations to interact with messaging users who own a messaging communication device by using the services of messaging service providers.

41 Claims, 13 Drawing Sheets

FIG. 13

```xml
<?xml version="1.0" encoding="UTF-8"?>
<dialog id="11000000000000000000000000002">
  <!--Dialog XML for SMS Marketing-->
  <start id="#node7" />
  <state id="node5" description="Send MVP to Join.">
    <prompt>Send MVP to vote for the Super Bowl MVP. Reply MVP.</prompt>
    <reply-sms>Send MVP to vote for the Super Bowl MVP. Reply MVP.</reply-sms>
    <end next="#node7" />
  </state>
  <state id="node7" description="Wait for MVP">
    <prompt>Send MVP to vote for the Super Bowl MVP. Reply MVP.</prompt>
    <switch>
      <case expr="[m|M][v|V][p|P].*">
        <assign name="waitForMVP" expr="MVP" />
        <goto next="#node8" />
      </case>
      <case default="true">
        <goto next="#error" />
      </case>
    </switch>
  </state>
  <state id="node8" description="Who was 2002 Super Bowl MVP?">
    <prompt>Who was 2002 Super Bowl MVP? Reply 1 - Brady or 2 - Law or 3 - Warner.</prompt>
    <reply-sms>Who was 2002 Super Bowl MVP? Reply 1 - Brady or 2 - Law or 3 - Warner.</reply-sms>
    <end next="#node9" />
  </state>
  <state id="node9" description="">
    <prompt>Who was 2002 Super Bowl MVP? Reply 1 - Brady or 2 - Law or 3 - Warner.</prompt>
    <switch>
      <case expr="1">
        <assign name="MVP" expr="Brady" />
        <goto next="#node10" />
      </case>
      <case expr="2">
        <assign name="MVP" expr="Law" />
        <goto next="#node11" />
      </case>
      <case expr="3">
        <assign name="MVP" expr="Warner" />
        <goto next="#node12" />
      </case>
      <case default="true">
        <goto next="#error" />
      </case>
    </switch>
  </state>
  <state id="node10" description="Thanks for Voting.">
    <prompt>Thanks for voting. Be sure to visit the NFL shop at http://www.nflshop.com.</prompt>
    <reply-sms>Thanks for voting. Be sure to visit the NFL shop at http://www.nflshop.com.</reply-sms>
    <submit namelist="MVP" next="http://localhost:8080/campaignapp/servlet/saveResponse" />
    <goto next="#node14" />
  </state>
  <state id="node11" description="Thanks for Voting.">
    <prompt>Thanks for voting. Be sure to visit the NFL shop at http://www.nflshop.com.</prompt>
    <reply-sms>Thanks for voting. Be sure to visit the NFL shop at http://www.nflshop.com.</reply-sms>
    <submit namelist="MVP" next="http://localhost:8080/campaignapp/servlet/saveResponse" />
    <goto next="#node14" />
  </state>
  <state id="node12" description="Thanks for Voting.">
    <prompt>Thanks for voting. Be sure to visit the NFL shop at http://www.nflshop.com.</prompt>
    <reply-sms>Thanks for voting. Be sure to visit the NFL shop at http://www.nflshop.com.</reply-sms>
    <submit namelist="MVP" next="http://localhost:8080/campaignapp/servlet/saveResponse" />
    <goto next="#node14" />
  </state>
  <state id="node14" description="">
    <end next="#node14" />
  </state>
  <state id="error">
    <reply-sms prefix="Sorry, I do not understand." />
    <end />
  </state>
</dialog>
```

INTEGRATED INTERACTIVE MESSAGING SYSTEM AND METHOD

PRIORITY CLAIM

This application claims the benefit of priority of U.S. Application No. 60/397,402, filed Jul. 19, 2002, the entire contents of which are incorporated by reference as if set forth at length herein.

FIELD OF THE INVENTION

This invention relates to executing communication programs and direct marketing techniques using data messaging communication devices.

BACKGROUND OF THE INVENTION

Global brands spend hundreds of billion of dollars annually just in the United States on brand marketing and communications. Over the last decade, an increasing percentage of brand marketing budgets have been spent in direct marketing channels (e.g., direct mail, telemarketing, email, etc.). In fact, total brand spending on direct mail now exceeds that of broadcast television. Given direct marketing's unique capabilities, such as precise targeting, the ability to drive specific behaviors, and highly measurable results, marketers are expected to continue spending heavily in direct channels.

One of the most significant new direct marketing opportunities is the emergence of the wireless, instant messaging, interactive TV, and other messaging oriented channels. The wireless channel provides marketers the unmatched ability to reach the individual (not just the household), in a time- and event-sensitive way, with attractive and measurable marketing ROI's. In Europe, hundreds of brands are beginning to utilize the wireless channel and are committing a sizeable portion of their communications budgets over the next year to wireless.

Most of the communication programs and applications we refer to in this invention are short, two-way, user initiated communications tied to an event or action in a user's daily life.

A bank overdraft yields an alert message to a user's handset asking them to call customer service immediately.

A flight cancellation due to weather starts a dialog where the user is asked if she wants to re-book on a different flight.

A swipe of a loyalty card on entry into a supermarket generates a message with the special offers of the day.

A short-code flashed on the Jumbotron at a stadium kicks off voting on a call made by a referee.

A carrier announces the launch of new services for their subscribers through messaging.

These message-based applications can only work if they can get to the messaging user while he is out and about and have true, measurable value if the messaging user can respond immediately to take appropriate action. They are personal, of interest to the messaging user, and entirely opt-in.

Interactive messaging, that is technology based on the interactive exchanges of messages between users and applications, is developing into a critical communication metaphor for consumers and organizations alike. Two-way text messaging, multi-media messaging ("MMS"), Instant Messaging and Flash™ based websites are all fast growing interactive messaging technologies. Indeed, on mobile devices, the limited screen real estate and input capabilities of devices make this a better interaction metaphor than the browsing metaphor prevalent on the desktop web.

Interactive messaging applications can either be free form, or directed. The goal of directed dialogs is to make it easy for messaging users to interact with the application:

Easy to initiate—by texting to a service address.

Immediate and real-time response without the messaging user having to wait for a connection or a download.

Convenient in that the messaging user is free to respond at his or her own time of choice.

Simple and clear options.

Stateful and context sensitive applications.

Easy to opt-out if the messaging user no longer wants the interaction.

Multi-media messaging and the ability to link to WAP pages allow for the easy integration of interactive messaging dialog applications with rich content. Above all, interactive messaging applications can be implemented in scale now with the availability of two-way Short Message Service ("SMS") on a majority of mobile phones.

In the very important cell phone and wireless carrier messaging market, the wireless carrier obviously has access to its subscriber base and can leverage their messaging capabilities to run internal communication programs, campaigns and applications. But using this channel only for the carriers' purposes is not fully leveraging this channel. This capability needs to be offered to other organizations such as brands. And most brands need to be able to reach all its customers across all wireless carriers to justify investing in interactive messaging. Hence it is critical for a messaging system, as described in this invention, to be usable by organizations that are not wireless carriers, or messaging service providers and to have the capability to route messages to and from a plurality of message service providers.

Messaging programs can be broken into three categories: push programs, pull (also known as triggered) programs and two-way push programs. Push programs are messaging programs where an initial message is pushed out to a messaging user that has supplied his messaging device address and has opted in to receive data messages. Push programs can further be classified as simple push programs, which essentially consists of a single message; and two-way push programs, which are push programs that initiate a dialog with messaging users and are designed to respond to messaging device originated messages. Pull programs are programs that are initiated by the messaging user. The messaging program existence is communicated through another channel (for example through print media, TV, radio, in-store display, on-product display) and encourages the messaging user to send an initial message to a service address. This act causes the messaging user to engage in a dialog that was designed by an organization program designer or marketer. Often these messaging programs are applications such as polls, quiz and other games or contests of interest to the messaging user.

Push and two way-push programs are also termed organization-originated programs since the messaging application initiated the communication on behalf of the organization. Pull programs are similarly termed messaging user originated since the messaging user initiated the communication.

A messaging system is needed to enable organizations to quickly develop and execute these sophisticated push, pull and two-way communication programs

PRIOR ART

As a result of the spending in direct marketing, much innovation and development has occurred in tools and techniques to carry out direct marketing activities across existing traditional channels.

The existing direct marketing systems built for the existing channels are outbound only systems. Their goal is to direct the user to take an action, such as calling a number, visiting a web site or a physical retail store. The user is not expected to reply back to the pushed messages. Of course such system cannot be used to build the type of two-way communication programs described in this invention.

Some of the existing tools, in particular the existing e-mail campaign management are very adept at pushing out e-mails. This can be leveraged today for some of the messaging technologies targeted by this invention, in particular e-mail itself and mobile messaging that either use Simple Mail Transport Protocol ("SMTP") directly or through gateways. E-mail marketing tools are push only, they can't be used to build two-way programs. Even for push programs these tools have serious limitations. E-mail is not the native addressing protocol for cell phones, which primarily use Short Message Service ("SMS"), Enhanced Messaging System ("EMS"), or Multimedia Messaging System ("MMS"). The e-mail tools do not perform the routing logic required to identify the correct carrier to deliver messages to. Existing public gateways limit the amount of messages that can be sent in a unit of time to fight unsolicited messages. SMS itself has character size limitations that do not exist in the e-mail world.

Existing campaign management tools do not take into account the unique role of mobile service providers, such as wireless carriers, in the message delivery process. Mobile service providers introduce business relationship constraints, require adherence to privacy policies. They have unsolicited messages requirements. They have billing requirements that do not exist in the open standard world of the Internet.

A few first generation wireless marketing platforms are available. Most are either mostly push oriented, making them not that much different than the existing e-mail marketing platforms; or only support a few hard coded program flows, for example simple votes; or are low level platforms that require professional services coding to develop new programs. But they do handle the routing and formatting of messages required by the mobile channel.

Existing mobile marketing platforms tend not to support extensible session management capabilities within the platform. The simple systems offer no session management. The more advanced system are capable of directing all user requests within a session to one IP address or URL, but managing state within such an application is the responsibility of the application. This makes it difficult for an organization's marketing person to design and implement sophisticated dialogs on his own. In addition, because each application manages its own state, data about a user interaction in one application is not available to another application without special software development.

Existing campaign management tools are not application platforms, but that capability is required to build anything but the simplest communication program. And existing application servers are not focused on the unique messaging needs and the campaign management needs.

Mobile messaging systems developed for geographical markets, such as Europe, that have standardized on a single technology, such as Global System for Mobile communication ("GSM") cannot be used in geographical markets that use multiple technologies, such as North America, where a messaging platform requires a sophisticated routing component.

Existing systems are built to only support a single technology. They are many e-mail campaign management tools. There are a few instant messaging bot environments. None are designed to support in one program all of the common messaging technologies available today. Most programs also benefit from being run simultaneously across multiple messaging technologies to reach a maximum of users using their channel of choice.

While SMS pull campaigns have been implemented in some markets, these are often achieved using short codes for service access codes. Short codes are numeric addresses (from 1-20 digits, but typically 4-9 digits) that do not map to subscriber numbers used by wireless carriers to enable access to SMS-based value-added applications and services numbers and that have to be programmed into a carriers network equipment (usually the SMS-C). Because of this requirement, deploying new short codes is very time consuming, and takes many weeks. Because of this constraint it is common for wireless carriers to use a small number of Short Codes and layer an extra layer of SMS menus, which is not a user-friendly approach. A messaging platform needs to support automated service address management. Existing systems lack this capability and require manual configuration for each service address.

Hence no system exists today that provides all the required functionality in an integrated system.

OBJECTS AND ADVANTAGES

The present invention addresses many of the limitations of existing system in one integrated system. The specific object and advantages for this invention are:

a) Designed to integrate with data messaging networks for the delivery and receipt of messages, including user initiated messages (pull programs)

b) Designed to support dialogs across a wide set of wireless messaging technologies, including, but not limited to SMS, EMS, MMS, mobile e-mail, Wireless Application Protocol ("WAP"), hyper text markup language ("HTML"), xHTML, Instant Messaging (IM), simple object access protocol ("SOAP"), and client side mobile device execution environments based applications.

c) Designed to handle any mobile or wireless technology that support data messaging. For example, the platform is designed to support the following wireless technologies: code division multiple access ("CDMA"), Global System for Mobile communications ("GSM"), Integrated Digital Enhanced Network ("IDEN™"), time division multiple access ("TDMA"), 801.11 wireless technologies and Bluetooth™.

d) Designed to provide automated service address management, like service access code and mail address management. This automated management of service access codes by using a pool of addresses that get allocated to each program for a time duration means messaging programs can be scheduled at a greater frequency and overlay techniques such as menus are not required.

e) Designed to provide integrated billing and reconciliation functionality. The system will track message usage and generate invoices for usage of the system. The system will track usage to generate accounts payable entries for delivery of messages charges owed to mobile service providers.

f) Designed to provide integrated data capture, data reporting and data analysis of messaging user interaction with the platform.

g) Designed to track session state for each messaging user and messaging program, using a general purpose messaging engine, allowing for the rapid development of sophisticated message programs with little to no programming effort required.

h) Designed to host messaging instructions on any data network accessible server, thereby facilitating integration with third party systems, and leveraging existing web infrastructure for complex applications.
i) Designed to allow for the development of messaging applications that are easily integrated with existing web applications.
j) Designed to support multiple organizations on a single platform.
k) Designed to support a hierarchical set of organizations.
l) Designed to capture messaging users interactions into organization owned databases.
m) Designed to allow the use of organization data or data collected by the messaging system in previous user interactions in running messaging programs.
n) Designed to provide immediate feedback, reporting and analysis of messaging user behavior.
o) Designed to support externally triggered campaign start using Web Services standards. Applications of these, includes but is not limited to, sending one or more messages after user interacts with an interactive voice recognition ("IVR") system.
p) Designed to allow messaging users to opt-in and opt-out of messaging programs.

SUMMARY OF THE INVENTION

The present invention is a message application server that allows for the development, by an organization program designer or marketer, of sophisticated interactive messaging programs and applications. The present invention is a complete system to develop push, pull and two-way messaging programs and applications. The programs and applications make use of data available to the organization either by uploading the data to the system or through real-time integrations.

Every messaging program or applications is different. An organization program designer or marketer needs to be able to design any messaging application, from the simple push of a single message to data rich interactive applications based on application data. Earlier we gave examples of sample messaging applications. In one preferred embodiment more complex applications are developed using a design language containing instructions that are executed by the message application server when messages or external events are received. The design language and the execution units that execute them have support to be integrated with the organizations existing computing systems. In one preferred embodiment of this invention, some of the messaging instructions can be dynamically generated directly by the organizations systems, providing for complete flexibility.

The present invention allows external organizations, which are separate from the messaging service providers, such as brands, to interact with messaging users owning a messaging communication device across multiple messaging service providers. The message application server is logically located between the organizations and the messaging service provider networks. Each organization has a private view of their data and does not see other organizations at their level or above. The practical application of this feature is the invention is designed to be used in an application service provider ("ASP") model.

The message application server 200 described in this invention is broken into three main components. The dialog designer 104 is the user interface for organizations to the system; to design, test, execute and analyze messaging programs and applications. The dialog server 106 is the runtime component that executes the programs and applications designed and scheduled in the dialog designer 104. The message exchange 108 is responsible for routing and queuing messaging device originated and terminated messages, and for interfacing with a plurality of messaging service providers.

This breakdown into three components is important. By placing all the messaging and routing logic in the message exchange 108, the other components do not need any knowledge about the messaging service providers. The dialog server 106 contains all the session management and messaging logic. It is meant to be a high performance and highly scalable real-time messaging engine and is completely focused on the execution needs of programs and applications. The dialog designer 104 is primarily focused on presenting a user interface to the messaging application server. It is focused on web presentation technology and tends to have less severe scalability requirements. This breakdown in three major components also has strong business benefits as multiple business models can be supported. A single service organization can host all three components and license the platform in an ASP manner to multiple organizations. Or, said organizations can decide that scale or privacy dictate that they host in-house the dialog designer 104 and/or dialog server 106 and contract only to a message delivery aggregator for the message exchange 108. Or, a messaging service provider can host all three components for internal use.

The system described in this invention is designed to use any data messaging protocol to interact with said messaging user. Supported messaging devices, includes but is not limited to, data enabled cell phones, wireless enabled PDA's, instant messaging devices, mobile e-mail devices, interactive TV devices. Supported messaging technologies, includes but is not limited to, SMS, EMS, MMS, WAP, HTML, xHTML, HTML derivatives, e-mail, instant messaging, interactive TV, and client side mobile device execution environments such as Java 2 Mobile Edition ("J2ME™"), Brew™, Linux™, or Symbian OS™. The system supports integration with an organization's existing customer relationship management system to coordinate and measure responses across all communication channels.

The present invention allows an organization to design, execute and analyze personalized one-to-one messaging communications. This is accomplished with a strong built-in data architecture. Organizations can import data on their customers easily by uploading said data to the message application server using list objects. The data can be used to create segments that are then used as the basis for push programs. The data can also be accessed from within messaging programs. As messaging users interact with a program, their responses can further be saved and used as a basis for future programs, or downloaded back to the organizations systems. This allows for data rich applications, user response analysis and integration with organization systems, including but not limited to customer relationship management ("CRM") systems.

In addition to the three major components discussed above, in one exemplary embodiment, a messaging application server includes within the three components described above a billing system, an opt-out system and an address manager.

Most messaging service providers charge for the delivery of messages to messaging users. Billing is hence a key component of a message application server. The functionality is critical if a third party organization is hosting the message application server, or just the message exchange and said third party acts as an intermediary between multiple messaging service providers and organizations. In this usage, said third party is billed by each messaging service providers for all the message traffic originating from the system by all organizations; and in turn it must invoice the organizations for all their message traffic across all messaging service providers. In one preferred embodiment, the billing system 182 is a part of the message exchange 108.

The present invention in one preferred embodiment manages the service addresses used by messaging programs and applications. All messaging programs and applications need to have one or more service address allocated to it, for each messaging service provider. When a messaging device originated message is picked up by this invention, the message is routed to the correct dialog server 106 instance, and then within the dialog server 106 to the correct program or application. This means that at any given time, only one service address can be in use. It is also very advisable that service address be assigned to the same organization for security reasons. Hence one preferred embodiment of the present invention includes an address manager, whereby service address can be entered in the system, configured and allocated to organizations. When an organization's marketer or program designer is ready to test or execute a program or messaging application, she selects which service address to use from among the service address allocated to the organization. In one preferred embodiment, the address manager 180 is a part of the message exchange 108.

Unsolicited messages are a fact of life in any messaging technologies. Each service provider implements sophisticated mechanisms, to prevent unsolicited messages. Any organization wishing to use a messaging service provider as a communication channel needs to follow the messaging service provider agreements. These agreements almost always include a provision to allow messaging users to opt-out from receiving further messages. In one preferred embodiment, this invention includes built-in support to manage opt-in and opt-out lists. If a messaging user has opted out from a particular opt-out scope, the opt-out system 156 will ensure that the user never receive further push messages for any messaging program within the same opt-out scope. In one preferred embodiment the opt-out system is a part of the dialog server 106.

Hence this invention provides in one integrated system all the key components for an external organization to conduct interactive messaging programs and applications with messaging users.

BRIEF DESCRIPTION OF THE DRAWINGS

FIG. 13—an exemplary representation of messaging instructions to be executed by the execution units.

DETAILED DESCRIPTION

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

Figure 1:
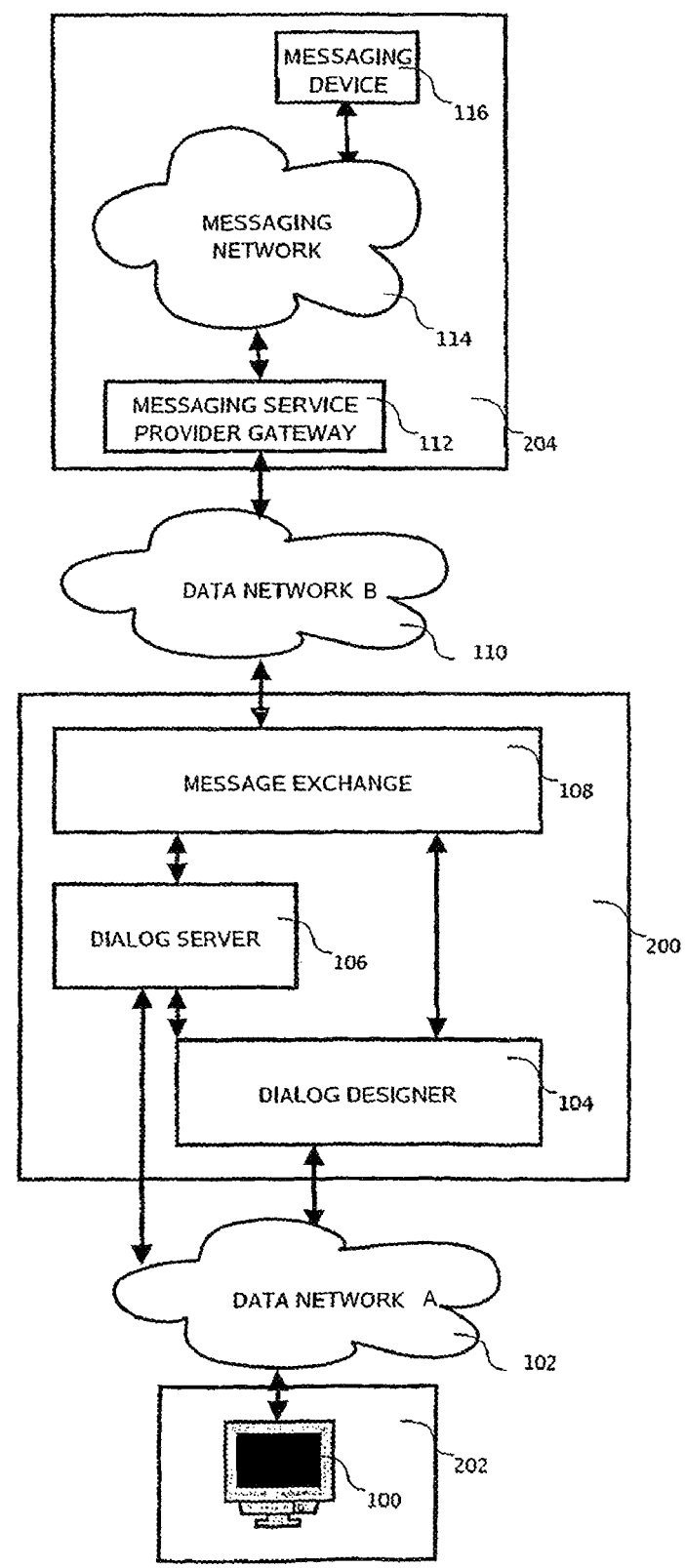
FIG. 1—depicts aspects of an exemplary embodiment of the present invention in accordance with the teachings presented herein.

Turning to FIG. 1 there is shown the basic architecture of one exemplary embodiment of the invention. An organization program designer or marketer accesses the system by means of a computer 100 equipped with a web browser. Said computer 100 is connected to the dialog designer 104 and the dialog server 106 by means of a data network 102. In turn the dialog designer 104 is connected by means of a data network or an inter process communication mechanism within a computing system to the dialog server 106 and the message exchange 108. The dialog server 106 is also connected to the message exchange 108 by means a data network or an inter process communication mechanism. The message exchange 108 is connected to the messaging service provider system 204 by means of a data network 110. The combination of the dialog designer 104, dialog server 106 and the message exchange 108 constitute the message application server 200.

The message exchange 108 can send and receive messages to and from the messaging device 116 by means of the messaging service provider system 204. The actual details of the messaging provider system are not relevant to this present invention and in practice take many form. In one exemplary embodiment, the messaging service provider system 204 is broken down into a messaging service provider gateway 112 responsible for interfacing with the message exchange 108 by means of data network 110. Using methods known to those skilled in the art, messages can be sent and received between the messaging device 116 and the messaging service provider gateway 112 by means of the messaging network 114. In another exemplary embodiment, the messaging service provider gateway provides for delivery of messages to a plurality of messaging service providers and is acting as a message aggregator or routing bureau. Other embodiments of the messaging provider system are possible and fall within the scope of this invention.

The present system described in this invention only knows about messaging device addresses. These often act as proxy for the messaging user owning or operating the messaging device. A messaging user could own multiple messaging devices and the system described in this invention would probably never know that they correspond in fact to the same messaging user. This distinction does become important for certain methods like handling opt-out lists. In that later case, when a messaging user opts-out, it is really the messaging device address of his current device that is opted-out.

The data network 102 is any data network, including but not limited to, the public Internet and private intranets.

The data network 110 is any data network. In one preferred embodiment the network is the Internet or private intranet. In one preferred embodiment the network is a dedicated lease line or a Virtual Private Network (VPN). In one preferred embodiment, the connection to wireless carrier SME's uses the short message peer-to-peer ("SMPP") protocol.

In one preferred embodiment, the message application server 200 is composed of three main components: the dialog designer 104, the dialog server 106 and the message exchange 108.

The dialog designer 104 is the user interface for organizations' program designer or marketers to the message application server 200. In one preferred embodiment, the dialog designer is configured to deliver a web-based point and click interface. The dialog designer is configured to allow for rapid program creation by an organization program designer or marketer. The dialog designer is configured to offer the program designer the ability to select the type of programs, to select one or more service addresses for programs, and to schedule programs for execution. The dialog designer is configured to offer the program designer the ability to manage a real-time database of messaging user profile information and create customized user segments by age, gender, location or any user profile information from data imported into the system, from data retrieved in real-time by the dialog server 106, or from data gathered in previous messaging programs. The dialog designer is configured to offer said program designer the ability to easily write, edit, test and send messages. The dialog designer is configured to generate reports, including real-time reports, for immediate control over program results.

The dialog server 106 is configured to execute the running messaging programs. In one preferred embodiment the dialog server is configured to manage multiple simultaneous programs with millions of users. The dialog server is configured to store messaging user's results information and maintain dialog sessions. The dialog server 106 is configured to maintain opt-in and opt-out lists ensuring consistent permission based communications. The dialog server is configured to provide extensive monitoring and alerting capabilities.

A messaging program needs to be stateful and maintain context between message invocations. A session consists of this state and all of the context associated with the session. This is one of the primary responsibilities of the dialog server 106. In one embodiment, the state of a messaging user in a program is stored in a state variable that is used as a key into the program instructions and context is persistently stored across message invocation by means of session variables maintained by the dialog server 106 across message invocations. A messaging program service address, and the messaging device 116 address acts as a key to uniquely identify a current session. In one preferred embodiment, it is possible to terminate a session, such that further interactions with the messaging program starts a new unique session.

In one exemplary embodiment, the message exchange 108 is connected with the carrier networks' Short Message Entity (SME) gateways and Short Message Service Centers (SM-SCs), with SMTP e-mail servers and with Instant Messaging service providers' messaging gateways. The message exchange 108 is configured to route user originated and user terminated messages to the right dialog server 106 and to the right messaging service provider respectively in a messaging protocol independent manner. The message exchange 108 is configured to report back to the dialog server 106 any message delivery status either reported by the message exchange itself or by the messaging service provider systems 204. The message exchange is configured to provide a management and uniform application programming interface to key messaging service providers' access points. The message exchange is configured to provide for billing and reports. The message exchange is configured to provide extensive monitoring and alerting capabilities.

Figure 2:
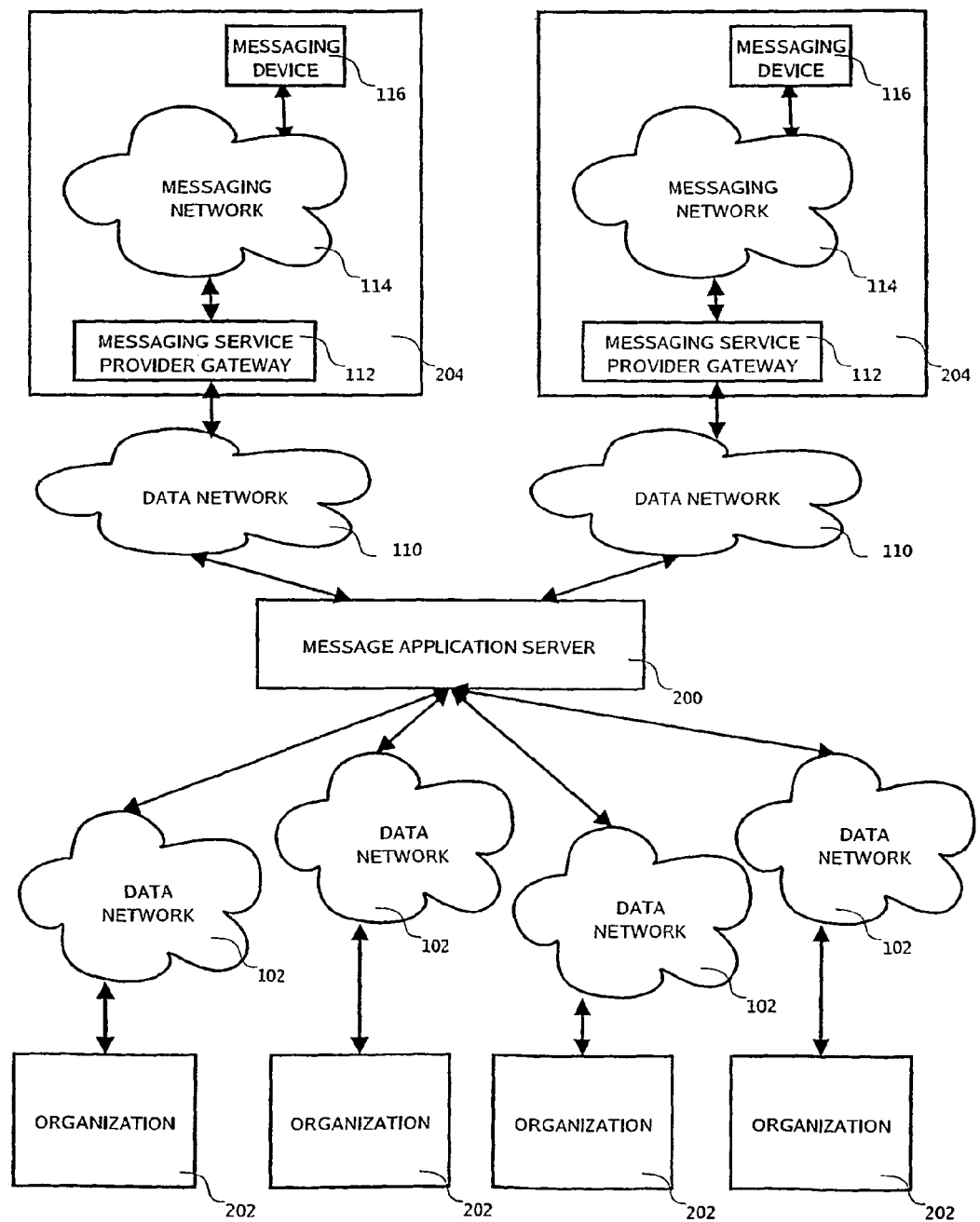
FIG. 2—depicts an exemplary embodiment of the present invention where a plurality of organizations are connected by means of the invention to a plurality of system providers.

Turning to FIG. 2 there is shown a preferred embodiment of this invention. The message application server 200 is connected to a plurality of messaging service provider systems 204 by means of one or more data networks 110. The message application server 200 is also connected to a plurality of organizations 202 by means of one or more data network 102. Each organization has the ability to run messaging programs that reaches all the messaging users serviced by said plurality of messaging service providers systems in a seamless manner. Each messaging service provider benefits from the increased messaging traffic, which is usually a source of revenue, and from a large pool of organizations by simply maintaining a single connection to said message application server 200.

Figure 3:
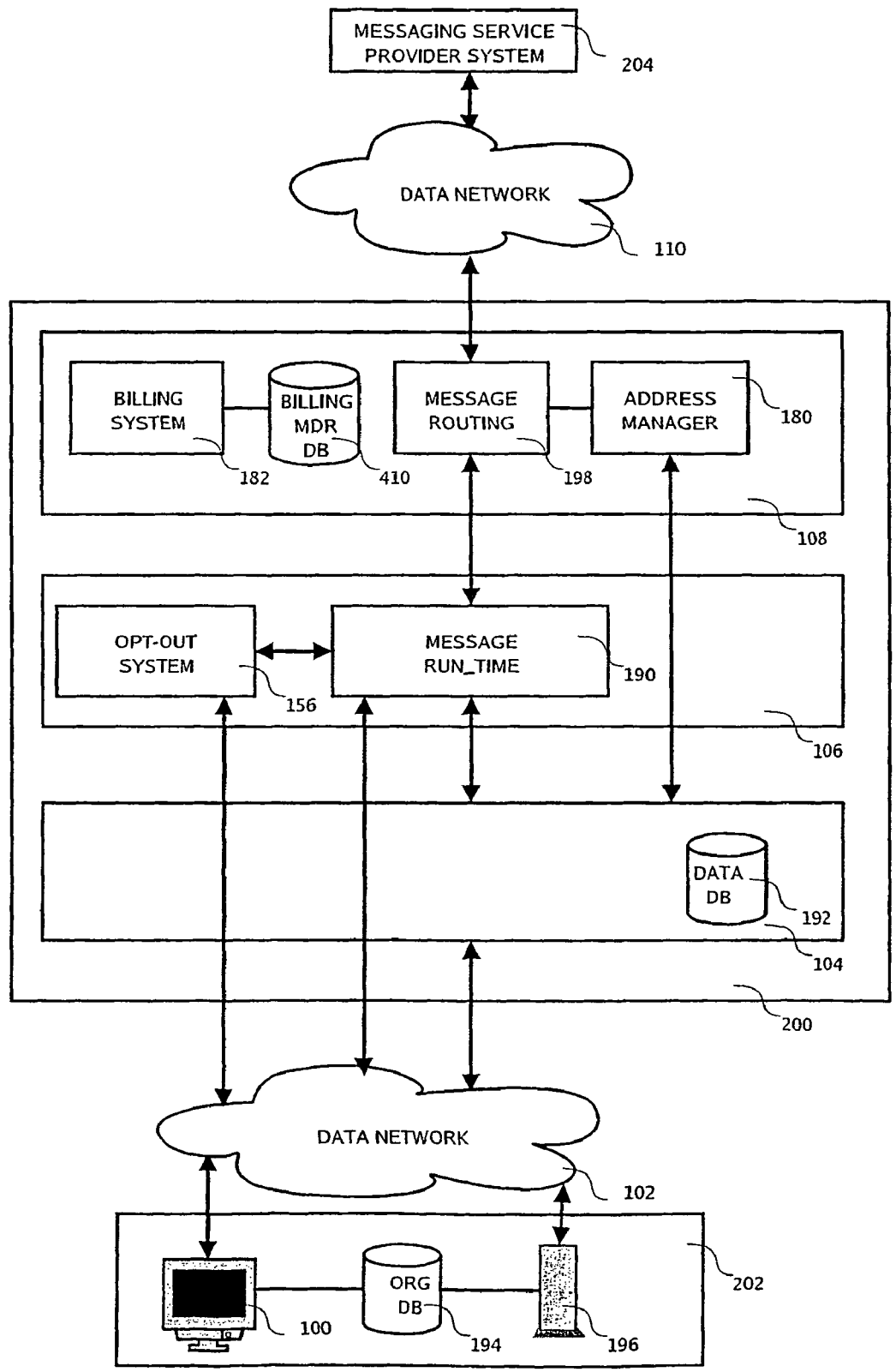
FIG. 3—depicts aspects of an exemplary embodiment of the present invention in accordance with the teachings presented herein.

Turning to FIG. 3 there is shown a preferred embodiment of the message application server 200. The dialog designer 104 further contains a data database 192. The data database 192 is used to store all messaging program specific data. Data that is either uploaded by the organization or generated in the course of the execution of a messaging program or application is stored in the data database 192.

In one preferred embodiment, the dialog designer 104 and the dialog server 106 directly access the data database 192. In another embodiment, the dialog server 106 forwards the data to the dialog designer 104, which then stores the data in the data database 192.

The dialog server 106 further contains the opt-out system 156 that is used to store the messaging device address of users that have opted-out from receiving future communications. When the message run-time 190 needs to execute a push program, the opt-out system is consulted and the messaging device addresses in the relevant opt-out list are filtered out from said push program. By having this functionality built-into the dialog server 106, program designers and marketers do not have to worry about sending messages to messaging devices whose users have opted-out and the feature ensures it is always enforced uniformly. Messaging programs through specific instructions can access the opt-out database for the purpose of entering opt-in records, of entering opt-out records or of querying the opt-out/opt-in status of a messaging device address. It can also be accessed directly by organization program by means of web services transmitted by data network 102.

The message exchange 108 further contains a billing system 182. The billing system consists of a user interface and a rating engine that rates the various message detail records ("MDR") generated by the message application server 200 and generates invoices based on the rated data In one preferred embodiment, billing of the message application server usage is done using an MDR architecture. In the MDR architecture, key accounting and billable events are inserted into insert-only MDR databases. An example of an MDR is the record created when a messaging device terminated message is sent by the message exchange 108, or a messaging device originated message is received by the message exchange 108. By separating the MDR records from other transactional data, it is easier to partition the data and archive old data when it is no longer needed on-line. Billing is then run over the MDR records, and invoices are created.

In one preferred embodiment, the dialog designer 104, the dialog server 106 and the message exchange 108 each contain an MDR database to which each logs MDR records.

On a regular schedule, consistent with the billing cycle, the data from these MDR databases are uploaded to the billing MDR database 410. Such architecture has a benefit of allowing the billing MDR database 410 to be on a system different from the dialog designer, dialog server and the message exchange active MDR databases.

The message exchange 108 further contains the address manager 180 configured to manage the service addresses for all the messaging programs. It consists of a web based UI to create, configure, provision, and administer service addresses. It consists of web service methods used primarily, but not exclusively, by the dialog designer 104 to retrieve, to reserve and to cancel the use of service address by individual messaging programs. Message routing is accomplished by the message routing component 198.

Organization program designers and marketers can access the message application server 200 from a web browser on a computer 100 connected to the message application server by means of a data network 102. In some preferred embodiments, the organization can also interface to the message application server using web service interfaces. This is useful when the organization needs to integrate an internal application 196 with the message application server 200. An example, would be creating some kind of contest inviting messaging users to sign up on a web registration page. Such page can be hosted by the organization. Once the messaging user has signed up, a web service call can be made to the message application server 200 to send a welcome message and start the contest dialog.

In one preferred embodiment, each component of the invention can be installed on one or more computing systems.

Figure 4:
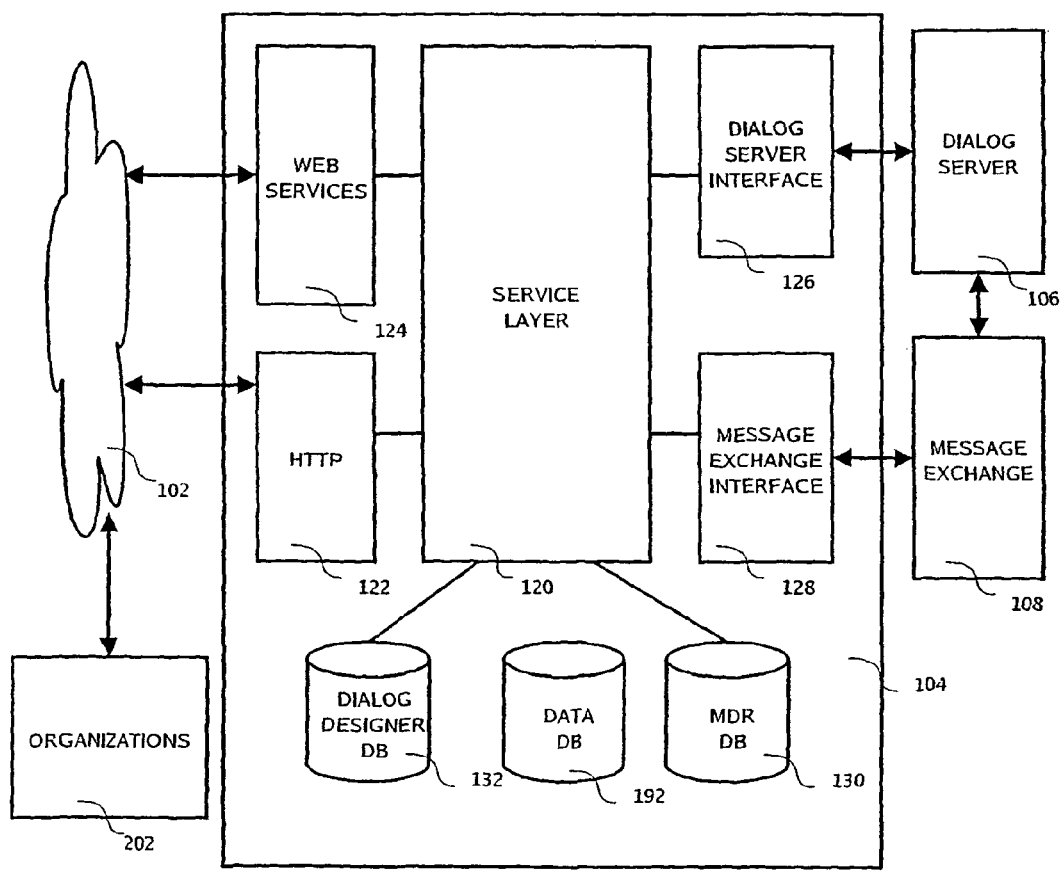
FIG. 4—depicts an exemplary embodiment of the dialog designer.

Turning to FIG. 4 there is shown a preferred embodiment of the dialog designer 104. The main components are the HTTP interface 122 to the dialog designer, used by organizations' program designers and marketers by means of data network 102; the Web Service interface 124 to the dialog designer used to automate access to the message application server 200 from the organizations and accessed by means of data network 102; the service layer 120 which implements the core functionality of the dialog designer 104; the dialog server interface 126 used to connect the dialog designer 104 to the dialog server 106; the message exchange interface 128 used to connect the dialog designer 104 to the message exchange 108; the dialog designer data database 132 used as the database storage for the dialog designer; the dialog designer data database 192 used to store messaging program related data; and the dialog server message detail record database 130 to log all critical billing or service level operations within the dialog designer 104. The HTTP interface 122 and the Web Service interface 124 are the external entry points for organizations into the dialog designer service layer 120. Other equivalent embodiments of the dialog designer are possible and fall within the scope of this invention.

In one preferred embodiment, the major integration points between the dialog designer 104 and the organization systems are through the HTTP interface 122 and the Web Service interface 124. The HTTP interface 122 is used by the organization dialog designers and marketers to access the message application server 200 by means of a web browser on their computers. The Web Service interface 124 is used by applications developed by the organization to access the message application server by automated means.

In one preferred embodiment, the major integration points between the dialog designer 104 and the message exchange 108 are through the message exchange interface 128. In one preferred embodiment, the message exchange interface 128 is configured to list the service addresses available to an organization's program designers or marketers; to reserve service addresses when programs are scheduled and tested, and to de-allocate service addresses when programs are ended or testing completes. In one preferred embodiment address management and reservation is implemented by the address manager 180 component in the message exchange 108.

Figure 5:
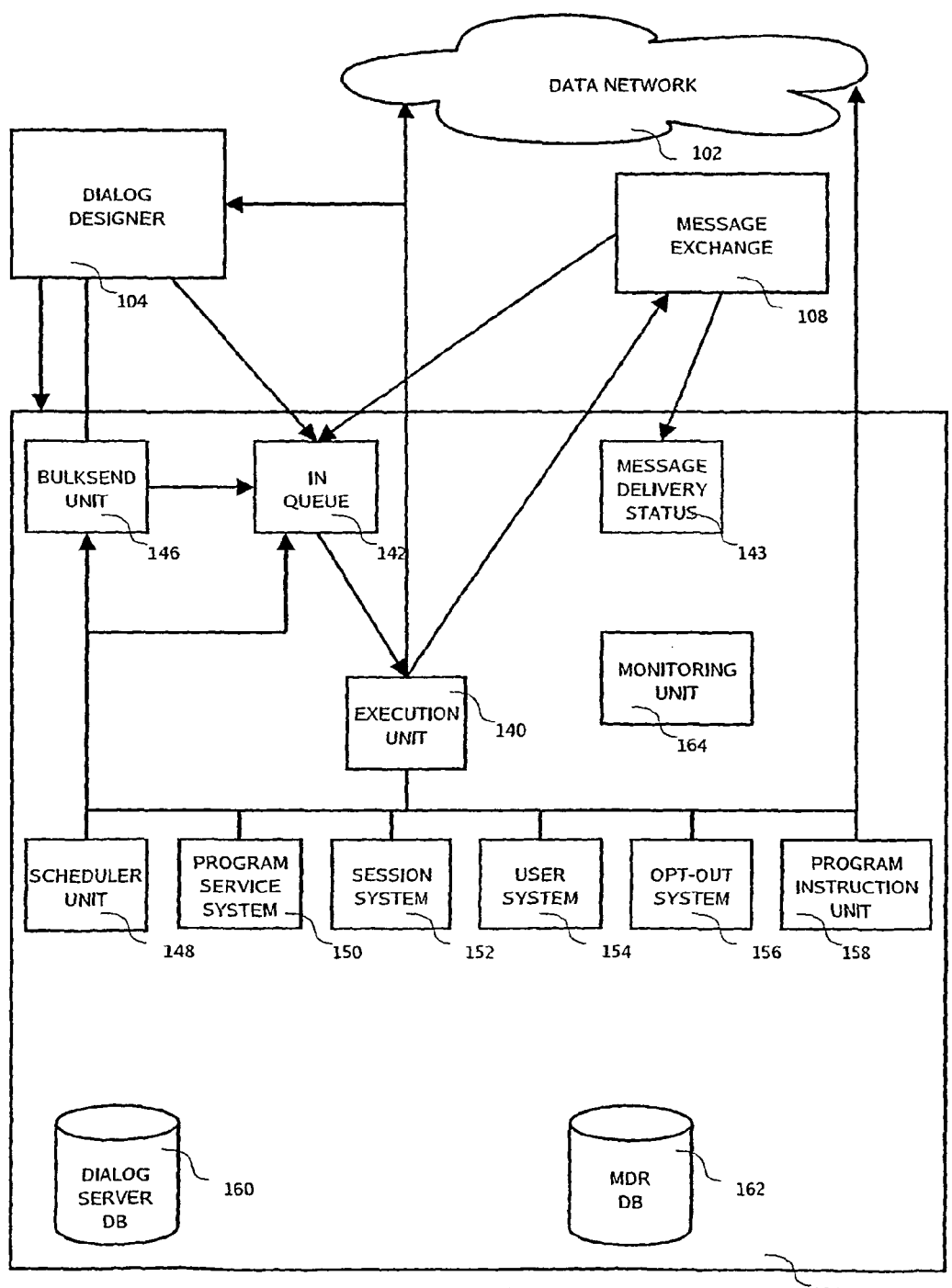
FIG. 5—depicts an exemplary embodiment of the dialog server.

Turning to FIG. 5 there is shown a preferred embodiment of the dialog server 106. The main components are the execution unit 140, configured to process the messaging device originated messages and other events; the scheduler unit 148 configured to start and stop messaging programs or send scheduled events to the execution units 140 at the scheduled times; the program service system 150 configured to manage the executable programs; the session system 152 configured to manage messaging users sessions; the user system 154 configured to manage the messaging users properties; the opt-out system 156 configured to manage the opt-in and opt-out status of messaging users; the program instruction unit 158 configured to retrieve and cache the program instructions required; the bulksend units 146 configured to efficiently send large pushes to messaging users within the program segment; the dialog server in-queue 142 which stores every messaging device originated message or events for execution by the execution units 140; the message delivery status system 143 used to record message delivery errors returned by the message exchange 108; the monitoring unit 164 used by network operating center ("NOC") systems to monitor the state of the dialog server 106; the dialog server database 160 for all the storage needs of the dialog server 106; and the dialog server message detail record database 162 to log all accounting or service level relevant events within the dialog server system 106. Other embodiments are possible for the dialog server and fall within the scope of this invention.

The program instruction unit 158 is configured to retrieve program instructions for the execution units 140. In one preferred embodiment, the program instructions are hosted on any Internet or intranet accessible web site. In one preferred embodiment, the program instructions are retrieved from remote computing systems using data network 102. This embodiment, when combined with dynamic generation of the program instructions, provide for a powerful means to integrate messaging programs with existing web applications.

In one preferred embodiment, the major integration points between the dialog server system 106 and the dialog designer 104 are program service management coordination between the dialog designer 104 and the dialog server 106; access to the bulksend segments held in the dialog designer 104 from the dialog server 106 during a bulksend; notification of per messaging users events; access from the dialog designer 104 to the opt-in and opt-out lists managed by the dialog server 106; the saving of data gathered from message executions back to the dialog designer 104; and the retrieval of program instructions stored in the dialog designer 104 by the program instruction unit 158.

In one preferred embodiment, the major integration points between the dialog server 106 and the message exchange 108 are the sending of messaging device terminated messages to the message exchange 108 for routing and delivery to the appropriate messaging service provider; and the receiving of messaging device originated messages from the message exchange 108 for processing by the execution units 140; and the notification to the dialog server 106 of message status delivery.

Figure 6:
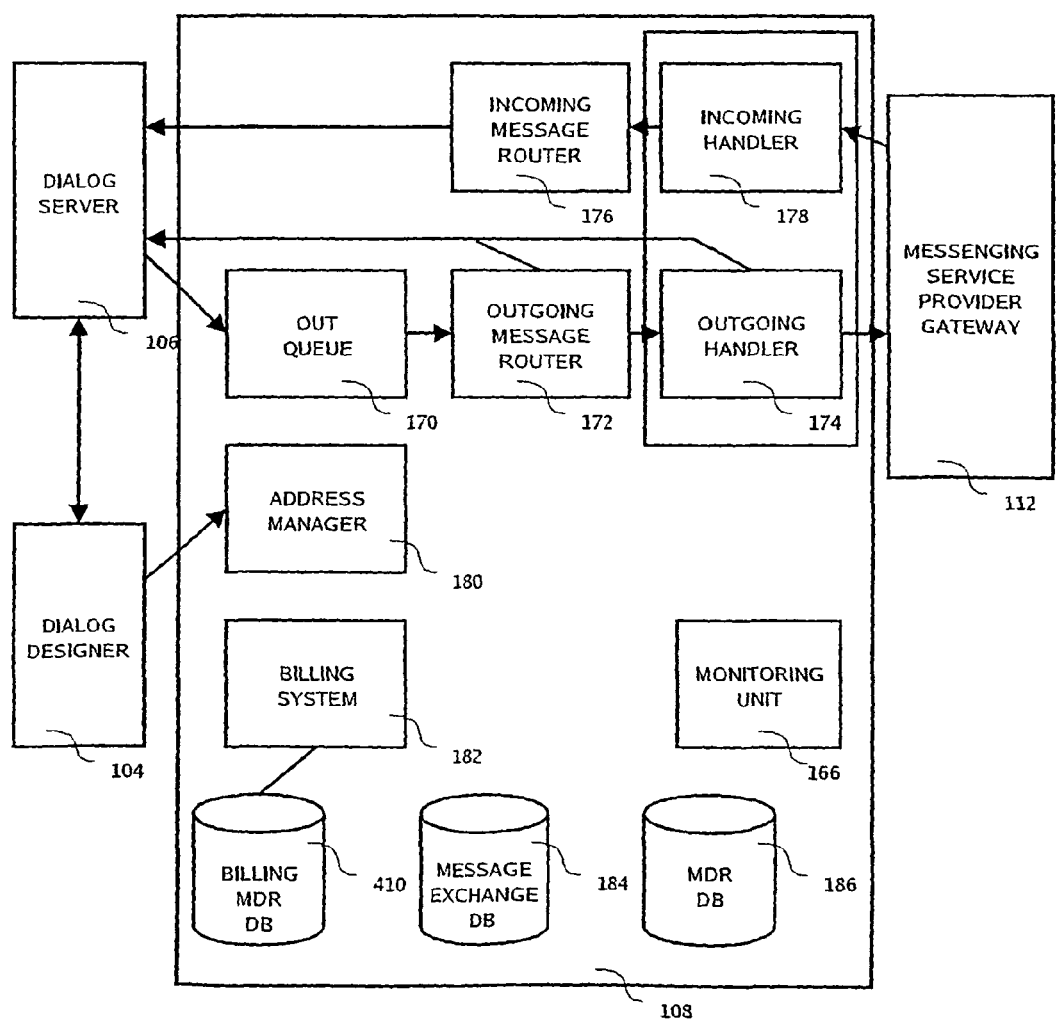
FIG. 6—depicts an exemplary embodiment of message exchange.

Turning to FIG. 6 there is shown a preferred embodiment of the message exchange 108. The main components are the out queue 170 configured to store messaging device terminated messages and connected to the dialog servers 106; the outgoing message router 172 configured to route messages based on the program service address and the messaging device address; the outgoing handlers 174 for each messaging technology configured to send messages to a particular messaging service provider gateway 112; the incoming handlers 178 configured to accept messaging device originated messages from the messaging service provider gateways 112; the incoming message router 176 configured to route messaging device originated message to the appropriate dialog server 106 and connected to the dialog server 106; the address manager 180 configured to create, configure, provision and administer program service addresses; the billing system 182 configured to display MDR logs, to rate and invoice messaging programs and applications; the monitoring unit 166 used by network operating center ("NOC") systems to monitor the state of the message exchange 108; the message exchange database 184 to handle the data storage needs of the message exchange 108; and the message exchange message detail record database 186 to log all billing or service level relevant events within the message exchange system 108; the billing MDR database 410 used to hold the MDR records for billing purposes. Other embodiments are possible for the messaging exchange and fall within the scope of this invention.

In one preferred embodiment, the interface between the messaging service provider gateway 112 and the message exchange 108 implements flow control. In one preferred embodiment, the interface between the message exchange 108 and the dialog server 106 implements flow control. Flow control relates to the concept of a receiver informing the sender that it can't accept any more data. If one component cannot sustain the traffic generated by another component, it informs the other component, which then stops sending additional messages until the bottleneck component has processed its backlog. A flow control architecture is critical to eventually stop or slow down large sources of messaging traffic—often a large bulksend. Without flow of control, some queues within the message application server could overflow, possibly leading to lost messages and system failures. In one preferred embodiment, flow of control is simply implemented by blocking the en-queuing of additional messages in a queue once it exceeds a certain depth.

In one preferred embodiment, the major integration points between the message exchange 108, and the messaging service provider gateways 112 are interfaces to send and receive messages based on the protocol required by the messaging service provider gateway 112. This includes flow of control notification if one system or another cannot accept more messages. It also includes administrative commands such as login in, message delivery status, and message delivery queries. Some of the messaging networks are stateful and the incoming handlers 178 and outgoing handlers 174 need to maintain the required state. For example, instant messaging networks require that the program bot name be connected to the network ("logged in"); incoming and outgoing handlers for instant messaging are configured to handle the login and logout of the bot. Other functionality performed by the handlers include resubmitting messages at a later date if the messaging device is not accessible—which is the case in instant messaging if the user is not online.

Figure 7:
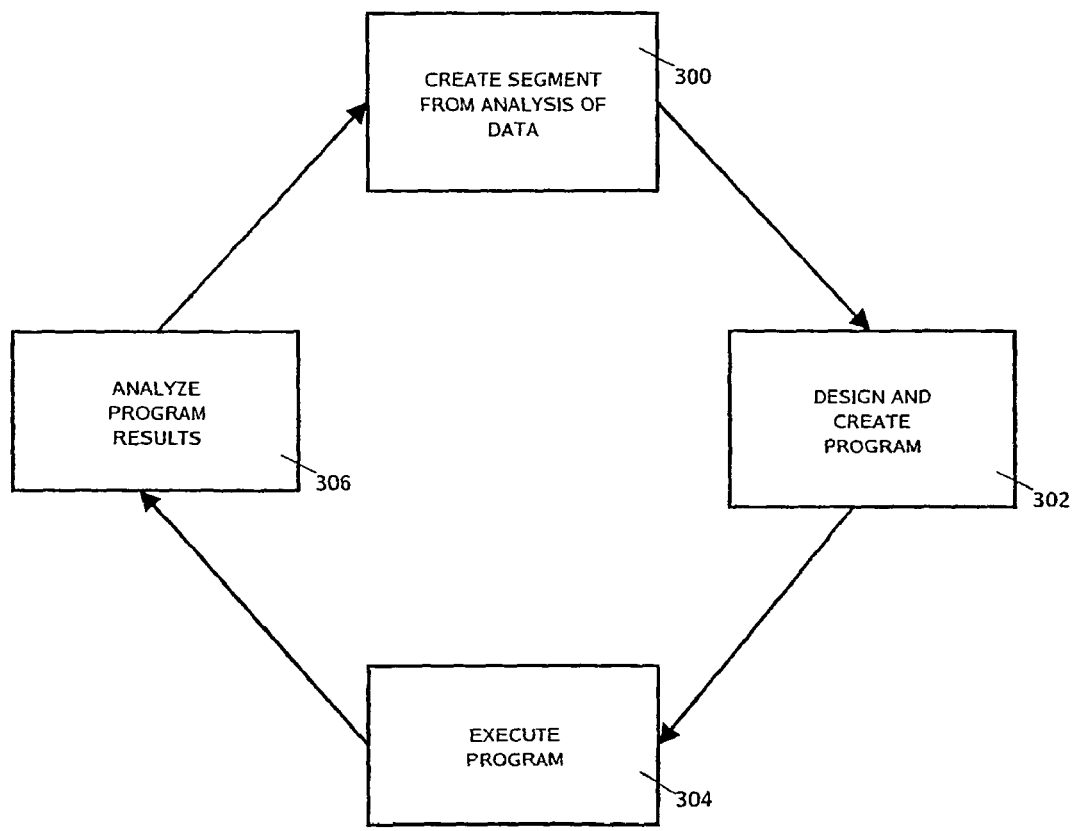
FIG. 7—depicts an exemplary flowchart of the close loop messaging program life cycle.

FIG. 7 illustrates the high level steps involved in designing, executing and analyzing messaging programs. The present invention supports, in a messaging context, the iterative life cycle that is common in direct marketing tools. For any messaging program, the organization's program designer or marketer has an objective in mind. In step 300 a segment is created for push programs based on existing organization data, data generated from past program executions and the objective of the program. In the case of pull programs, this step is skipped. In step 302, the program is designed and created driven primarily by the objective of the messaging program. In step 304, the program is executed. In step 306, which occurs either after the messaging program is executed (step 304) or while it is still being executed, the data generated by the program is analyzed. That data is then used in the next iteration to develop follow-on programs.

Figure 8:
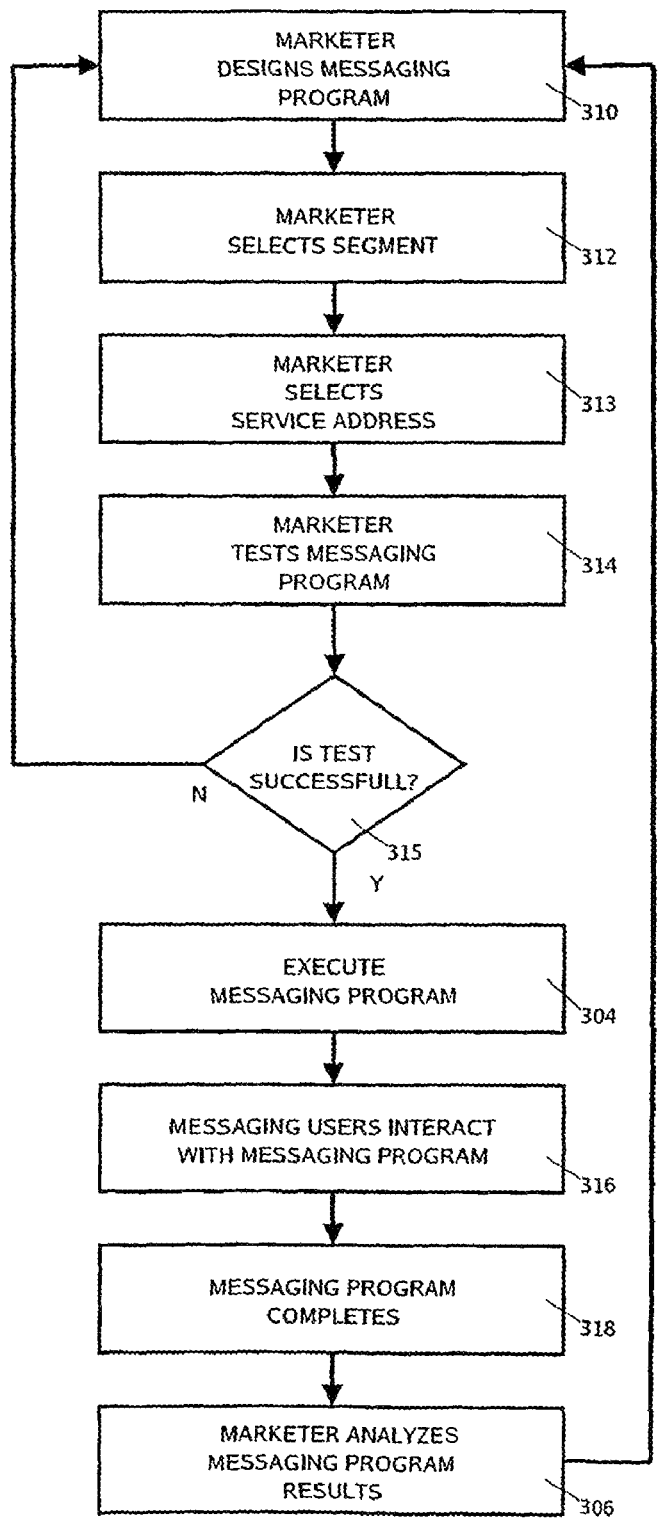
FIG. 8—depicts an exemplary flowchart of a program life cycle.

FIG. 8 illustrates of the steps involved in the complete life cycle of a messaging program in an exemplary embodiment of this invention. An organization's program designer or marketer designs a messaging program (step 310.) For push and two-way push messaging programs the program designer or marketer selects the segment containing all the messaging users that will receive the initial push message used to initiate a dialog (step 312.) The segment itself was created earlier in step 300. Pull messaging programs do not require a segment. The program designer or marketer selects the program messaging addresses (step 313.) The program designer or marketer tests the messaging program using a limited number of test messaging devices (step 314.) If the program designer or marketer is not satisfied with the test (step 315), she iterates back to step 310. If the program designer or marketer is satisfied with the test, the messaging program is executed (step 304.) Messaging users interact with the messaging application (step 316.) The dialog server 104 is configured to execute the messaging instructions that were designed in step 310. As messaging users interact, data is stored in the data database 192. Eventually the messaging program completes (step 318.) The program designer or marketer analyses the results of the messaging program (step 306.) Data collected as part of running the messaging program is available for use as input in future messaging programs.

Figure 9:
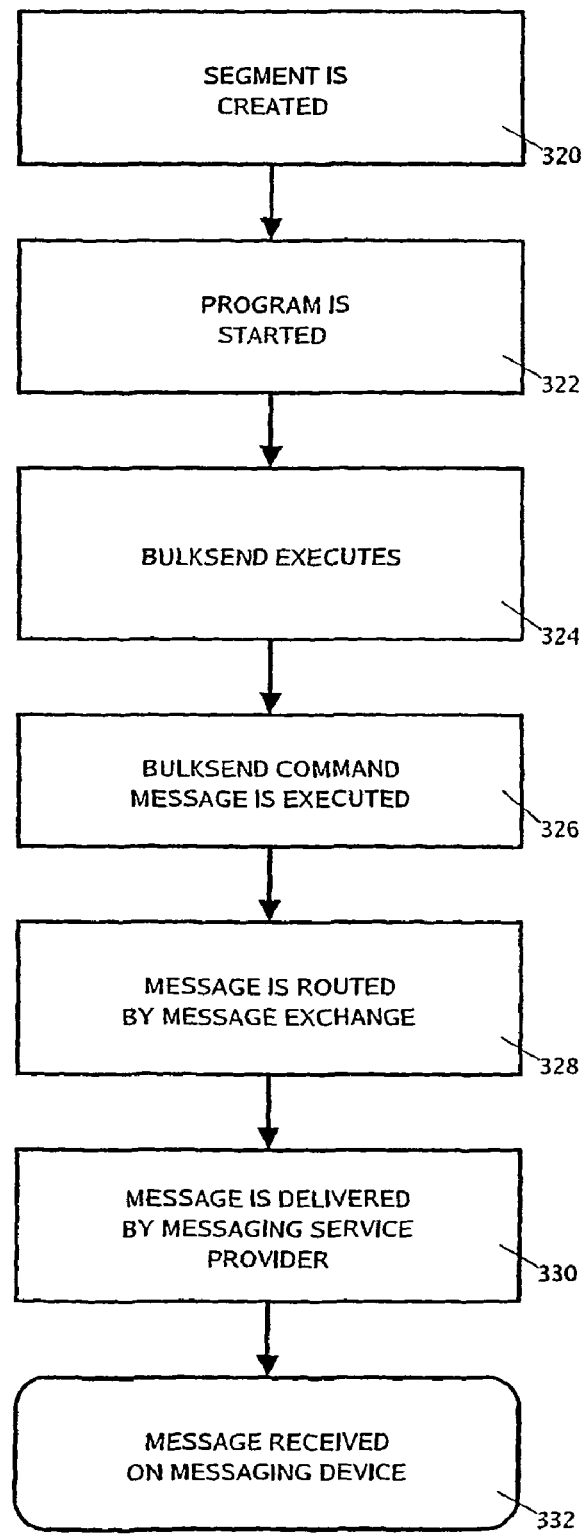
FIG. 9—depicts an exemplary flowchart of the initial push message of a push program.

FIG. 9 illustrates the steps to push out the initial message in a push program in an exemplary embodiment of this invention. The segment for the push program originates either from data stored in the organization database 194 or the data database 192 (step 320.) The segment includes the messaging device address of messaging users and other messaging user data used in the program instructions. Example of such data could be the user first name that is then used to create a personalized message. The scheduler unit 148 then starts the messaging program at the scheduled time (step 322) and starts the bulksend process (step 324). The bulksend process implemented in the bulksend units 146 retrieve the segment created in step 320. Each messaging device address is checked against the opt-out database by the opt-out system 156. If the messaging device address is not in the opted-out list, an initial event message is sent to the execution units 140 to execute the first instruction of the messaging program for that messaging device address(step 326.) Dialog server 106 message detail records are saved in MDR database 162; session and user information is stored in the dialog server database 160. In most cases step 326 involves sending a message to the messaging device. This message is forwarded to the messaging exchange 108 for routing and delivery (step 328). As part of step 328 message exchange message detail records are stored in the Message Detailed Record (MDR) database 186. If a message cannot be delivered, delivery status is sent back to the dialog server 106 for storage in the data database 192. The message is forwarded from the message exchange 108 to the messaging service provider gateway 112 and from there forwarded to the user messaging device 116 (step 330.) The message is then delivered to the messaging device 116 by the service provider system (step 332.)

Figure 10:
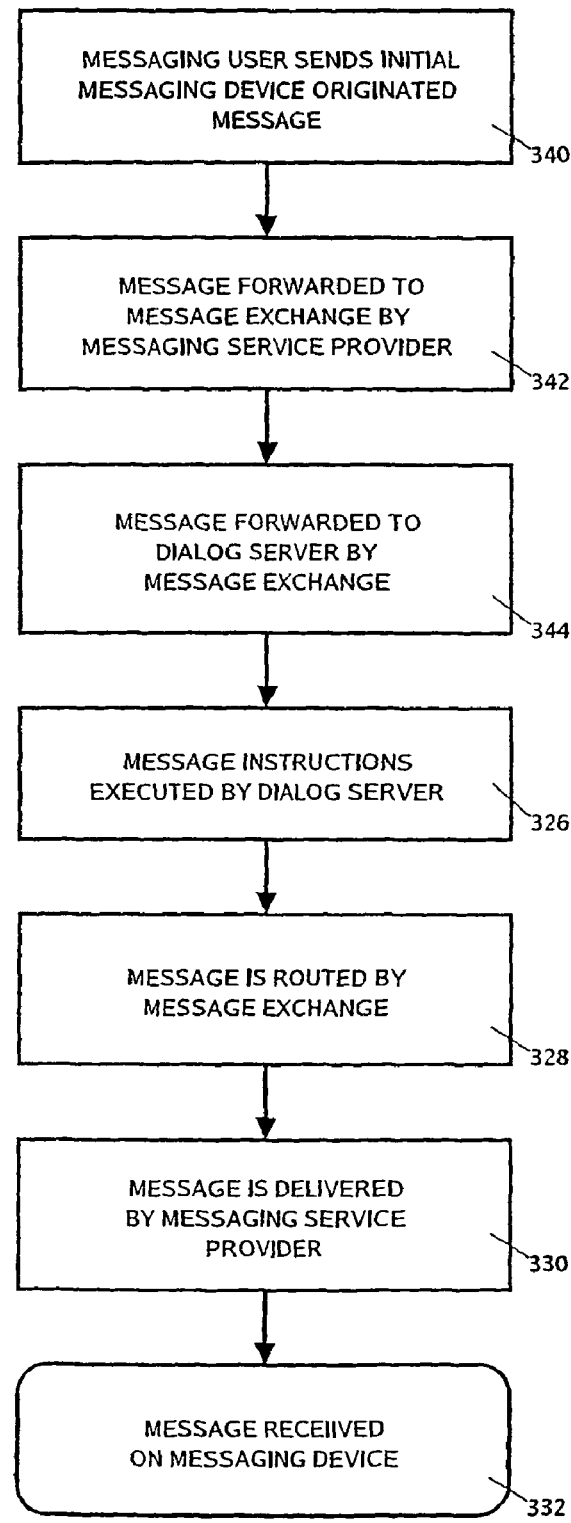
FIG. 10—depicts an exemplary flowchart of the processing of a messaging device originated message.

FIG. 10 illustrates the steps of pull program in an exemplary embodiment of this invention. The messaging user enters a message on his messaging device 116 and sends it to the program service address (step 340.) The messaging device originated message is routed by the messaging service provider to the message exchange 108 (step 342.) based on the program service address. The message is then forwarded to the appropriate dialog server 106 and logged into the message detail record database 186 (step 344.)

Based on the messaging device address and the program service address, the session information for this program and this user is retrieved from the dialog server database 160; the instructions for the program are retrieved by the dialog instruction unit 158 and the program instructions are executed by the execution unit 140; once the execution is completed the updated session is stored back in the database 160, and message detailed records are stored in the MDR database 162 (step 326.) Almost all messaging device originated messages results in a reply being sent back to the messaging user by the messaging application. In that case, the reply message is forwarded to the messaging exchange 108 for routing and delivery (step 328). As part of step 328 message exchange message detail records are stored in the message detail record database 186. If a message cannot be delivered, delivery status is sent back to the dialog server 106 for storage in the data database 192. The message is forwarded from the message exchange 108 to the messaging service provider gateway 112 and from there forwarded to the user messaging device 116 (step 330.) The message is then delivered to the messaging device 116 (step 332.)

In one exemplary embodiment, two way pushes, and follow-on message interactions are implemented using a combination of the steps illustrated in FIG. 9 and FIG. 10.

Triggered programs are pull programs initiated by an organization application 196 that is connected to message application server 200 by means of data network 102. The trigger application 196 sends a command message to the message application server 200 containing the messaging user messaging device address along with other data that becomes available to the execution units 140.

Figure 11:
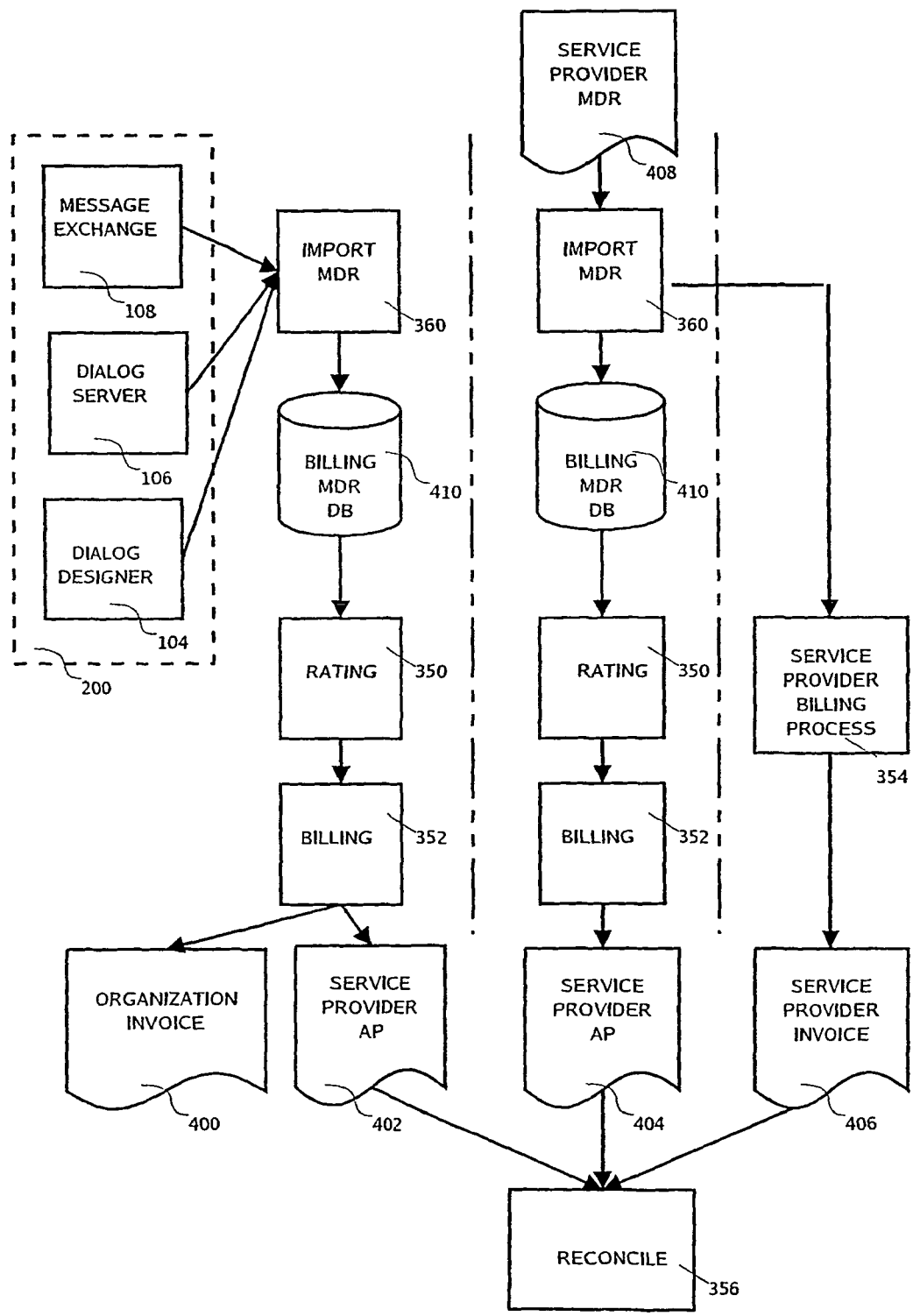
FIG. 11—depicts an exemplary flowchart of an exemplary embodiment of the billing method.
Figure 12:
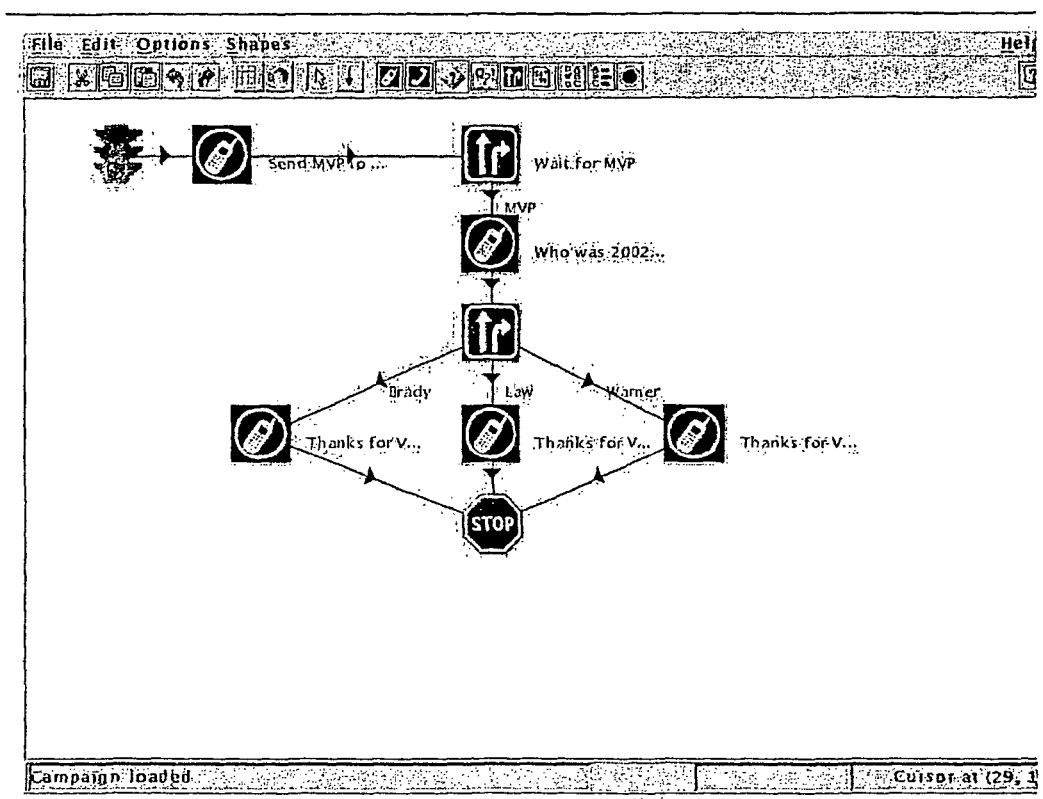
FIG. 12—a screen shot of an exemplary user interface to design messaging programs.

FIG. 11 illustrates the billing steps in one exemplary embodiment. The various message application server 200 components, the dialog designer 104, the dialog server 106 and the message exchange 108 generate message detailed records (MDR) which are stored in the dialog designer MDR database 130, the dialog server MDR database 162 and the message exchange MDR database 186 respectively. The MDR data is imported into the billing MDR database 410 (step 360). The MDR in the billing MDR database 410 are then rated (step 350) and billed (step 352) creating either organization invoices 400, or service provider accounts payable reports 402.

In one preferred embodiment, the service provider separately invoices the operator of the message application server for his message transport costs (step 354) resulting in a service provider invoice 406 for said operator. This service provider invoice 406 can be compared to the service provider accounts payable report 402 (step 356.).

In one preferred embodiment, the service provider may also forward the service provider MDR's 408 generated in the service provider network. These service provider MDR's records can be loaded in the billing MDR database 410 (step 360.). The service providers MDR's are then rated (step 350) and billed (step 352) creating another service provider accounts payable report 404. The service provider accounts payable report 404 can be compared to the service provider accounts payable report 402 and the service provider invoice 406 (step 356.)

In one exemplary embodiment, the dialog designer MDR database 130, the dialog server MDR database 162 and the message exchange MDR database 186 are the same database.

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques may be implemented in hardware or software, or a combination of the two. In one embodiment, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program may be implemented in a high level procedural or object oriented programming language to communicate with a computer system, however, the programs can be implemented in assembly or machine language, if desired. In any case, the language may be a compiled or interpreted language.

Each such computer program may be stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A system for organizations to develop, test, execute and analyze messaging programs defining a message application server comprising:

(a) a dialog designer configured to provide a user interface to an organization's program designer and marketer, to allow for rapid messaging program creation, to provide the ability to select a type of a messaging program, to select a service addresses for the messaging program, to schedule the messaging program for execution, to upload messaging user data into lists, to create segments, to download messaging program result data, to test the messaging program, to provide reports, including real-time reports, on the messaging program;

(b) a dialog server configured to execute the messaging programs by execution of a messaging instructions, to manage substantially simultaneously executed messaging programs, to store messaging user results and message delivery status, to maintain state and session context across message invocations for messaging users within a messaging program; and
- (c) a message exchange configured to route messages to and from messaging service providers, to manage service addresses, to perform message billing and to connect to messaging service providers;

whereby organizations can execute messaging programs interacting with messaging users via the messaging service providers.

2. The system of claim 1, wherein a plurality of organizations hierarchically organized can independently develop, test, execute, and analyze messaging programs.

3. The system of claim 1, wherein the organizations are not messaging service providers.

4. The system of claim 1, wherein the message application server is connected to a plurality of messaging service providers systems.

5. The system of claim 1, wherein the message application server is connected to the messaging service providers systems via a data network including, but not limited to, the Internet and private internet, using a variety of messaging protocols, including but not limited to, Simple Mail transfer Protocol (SMTP), Short Message Peer-to-Peer Protocol (SMPP), and instant messaging.

6. The system of claim 1, wherein the message application server is connected to the organizations via a data network including, but not limited to, the Internet and private intranets.

7. The system of claim 1, wherein the messaging users use messaging devices using a variety of messaging protocols including, but not limited to, Short Message Service (SMS), Enhanced Message Service (EMS), Multimedia Messaging Service (MMS), Wireless Application Protocol (WAP), HyperText Markup Language (HTML), eXtensible HyperText markup Language (xHTML), instant messaging, e-mail, interactive TV, and client side execution environments.

8. The system of claim 1, wherein the messaging programs and instructions are designed using a graphical user interface (GUI) design tool and have a text based representation.

9. The system of claim 1, further comprising a data database to store messaging program data; an opt-out system configured to store lists of users that have opted-out of messaging programs for a particular opt-out scope; a billing system to rate the messaging programs; an address manager to create, configure, provision, and administer messaging program service addresses; and one or more message detail record databases to record all critical service level or billing events.

10. The system of claim 9, wherein the data stored in the data database is used in future messaging programs.

11. The system of claim 1, wherein the organization accesses the dialog designer using a web browser from a remote computer via a data network.

12. The system of claim 1, wherein applications executed by the organization can interface with the message application server via web service calls using protocols including, but not limited to, Simple Object Access Protocol (SOAP).

13. The system of claim 1, wherein the message application server is configured to operate in conjunction with the organizations systems; including, but not limited to, customer relationship management (CRM) systems.

14. The system of claim 1, wherein the dialog server can access the messaging instructions from a remote computer systems connected to the dialog server via a data network whereby integration with remote systems can be achieved.

15. The system of claim 1, wherein the messaging instruction includes, but is not limited to, messaging primitives, unconditional logic primitives, conditional logic primitives, session variable primitives, input/output primitives, remote connectivity primitives, whereby any messaging program of arbitrary complexity can be developed and integrated with remote systems connected to a data network.

16. The system of claim 1, wherein the dialog server maintains session state and context across message invocations for a pair consisting of a messaging device address and a messaging program address.

17. The system of claim 1, wherein the dialog server, the message exchange and the connection to the messaging service providers store messages into queues with flow control techniques whereby queue overload is prevented or mitigated.

18. A method for organizations to develop, execute and analyze messaging programs comprising:
- (a) an organization's program designers designing the messaging program;
- (b) the program designer selecting a segment for push programs;
- (c) the program designers selecting a program service address;
- (d) the program designers testing the messaging program;
- (e) executing the messaging program where the messaging program is either started manually or automatically at a scheduled date;
- (f) messaging users interacting with the messaging program;
- (g) capturing and storing the messaging users responses and other messaging user data in a data database;
- (h) stopping the messaging program either manually or automatically at a scheduled date; and
- (i) analyzing the messaging program using the data captured and stored during the program execution;

whereby organizations can execute messaging programs interacting with messaging users via messaging service providers.

19. The method of claim 18, wherein the data captured as part of executing a messaging program is used in a subsequent messaging program.

20. The method of claim 18, wherein the segments are created from list data imported by the program designer into a data database, and from results data generated by the execution of prior messaging programs.

21. The method of claim 18, wherein the organizations deliver coupons, offers and promotions to the messaging users.

22. The method of claim 18, further comprising storing important service level and billable events in one or more message detail record ("MDR") database.

23. The method of claim 22, further comprising:
- (a) importing the message detail records generated by the message application server into a billing MDR database;
- (b) rating and billing the message detail records;
- (c) generating organization invoices and service provider account payable reports.

24. The method of claim 23, further comprising reconciling service provider invoices for messaging transport costs with service provider account payable reports generated from the message application server message detail records.

25. The method of claim 23, further comprising:
- (a) receiving message detail records generated in the messaging service provider system from the messaging service providers;

(b) importing the message detail records generated in the messaging service provider system into the billing MDR database;

(c) rating and billing the message detail records generated in the messaging service provider system;

(d) generating from the message detail records generated in the messaging service provider system service provider accounts payable reports; and (e) reconciling the accounts payable reports generated from the message detail records generated in the messaging service provider system with the accounts payable reports generated the message application server.

26. A method for organizations to deploy pull messaging programs comprising:

(a) receiving in a message exchange a messaging device originated message from a messaging user messaging device via a messaging service provider system, the messaging device originated message is of any one of a variety of messaging protocols including, but not limited to, Short Message Service (SMS), Enhanced Message Service (EMS), Multimedia Messaging Service (MMS), Wireless Application Protocol (WAP), HyperText Markup Language (HTML), eXtensible HyperText markup Language (xHTML), instant messaging, e-mail, interactive TV;

(b) forwarding the messaging device originated message from the message exchange to a dialog server;

(c) looking up the appropriate session context and pull messaging program based on the messaging device address and the program service address;

(d) executing pull messaging program instructions in the dialog server upon receiving the messaging device originated message and based on the session state and context;

(e) routing the messaging device originated message in the message exchange to the appropriate messaging service provider, and storing any message status delivery returned by the message exchange;

whereby the messaging users who sent a messaging device originated message receives a reply message on his messaging device.

27. A system for developing, analyzing, deploying, and monitoring targeted messaging applications, comprising:

a client systems, the client system comprising one or more messaging devices;

a message service provider system;

a message application server in communication with the client system and the message service provider system;

wherein the client systems is configured to interface with the message application server to enable the client systems to develop, analyze, test, deploy, and monitor messaging applications, the messaging applications to generate messages, receive messages from and send messages to the message service provider system, and wherein the message application server is configured to determine and route the messages to the message service provider system regardless of the message service provider system's implemented messaging technology.

28. The system of claim 27, wherein the message application server further comprises a dialog server configured to execute messaging applications by executing an application instructions, to manage substantially simultaneously executed message applications, to store messaging user results and message delivery status and to maintain state and session context across message invocations for messaging users within a messaging application.

29. The system of claim 28, wherein the message application server further comprises a message exchange in communication with the dialog server, the message exchange is configured to route messages to and from the messaging service providers.

30. The system of claim 29, wherein the message exchange is further configured to manage service addresses and to perform message billing.

31. The system of claim 29, wherein the message application server further comprises a dialog designer in communication with the dialog server and the message exchange, the dialog designer configured to provide an interface to the client systems to facilitate rapid message application creation, to provide the ability to select a type of message application, to select the service address for a message application, to schedule the message applications for execution, to upload messaging user data into lists, to create a segments, to download message application result data, to testing the message applications.

32. The system of claim 31, wherein the dialog designer further comprises a graphical user interface (GUI) design tool component to enable the client systems to develop, analyze, test, and deploy messaging applications.

33. The system of claim 31, wherein the message applications developed using the dialog designer comprise interactive message applications.

34. The system of claim 31, wherein the dialog designer further comprises a client interface component to reside on the client system and a server interface component to reside on the message application server, the client interface component being in communication with the server interface component to enable the client system to access the dialog server.

35. The system of claim 31, wherein the dialog designer is further configured to facilitate reporting on message application transactions.

36. The system of claim 28, wherein the dialog server comprises:

an execution unit to process messaging device originated messages and other events;

a scheduler unit to start and stop the messaging applications or send scheduled events to the execution unit at scheduled times;

an application service system to manage executable applications;

a session system to manage messaging user sessions;

a user system to manage messaging users properties;

an opt-out system to manage the opt-in and opt-out status of messaging device addresses;

an application instruction unit to retrieve and cache required application instructions;

a bulksend unit to send large pushes to messaging device addresses within an application segment;

a dialog server in-queue to store messages or events for execution by the execution unit;

a message delivery status system to record message delivery errors returned by the message exchange;

a monitoring unit to monitor the state of the dialog server;

a dialog server database to store information pertaining to the dialog server;

a dialog server message detail record database to log all accounting or service level relevant events within the dialog server;

a dialog designer interface to connect the dialog server to the dialog designer; and a message exchange interface to connect the dialog server to the message exchange.

37. The system of claim 36, wherein the message exchange further comprises:
- an out queue to store termination messages and dialog server connection messages;
- an outgoing message router to route messages based on the application service address and the messaging device address;
- a plurality of outgoing handlers, each for a specific messaging technology, to send messages to a particular messaging service provider gateway;
- a plurality of incoming handlers, each for a specific messaging technology, to accept messaging device originated messages from a particular messaging service provider gateways;
- an incoming message router to route messaging device originated message to the dialog server;
- an address manager to create, configure, provision and administer application service addresses;
- a billing system configured to display MDR logs, to rate and invoice messaging applications;
- a monitoring unit to monitor the state of the message exchange;
- a message exchange database to handle the data storage needs of the message exchange;
- a message exchange message detail record database to log all billing or service level relevant events within the message exchange system;
- a dialog server interface to connect the message exchange to the dialog server;
- a dialog designer interface to connect the message exchange to the dialog designer; and
- a billing MDR database to hold the MDR records for billing purposes.

38. The system of claim 37, wherein the dialog designer further comprises:
- a HyperText Transfer Protocol (HTTP interface to enable the client systems to access the message application server;
- a Web Service interface to enable the client systems to automate access to the message application server;
- a service layer to implement the core functionality of the dialog designer;
- a dialog server interface to connect the dialog designer to the dialog server;
- a message exchange interface to connect the dialog designer to the message exchange;
- a dialog designer database to store dialog designer transaction information;
- a dialog designer data database to store messaging application related information; and
- a dialog server message detail record database to store billing and service level operations information.

39. The system of claim 27, wherein the message service provider systems comprises:
- a messaging devices, the messaging device having a messaging device address, and
- a messaging service provider gateway communicatively connected to the messaging application server to provide for aggregation and delivery of the messages to the messaging device address.

40. The system of claim 27, wherein the messaging device is selected form a group consisting of data enabled cell phones, wireless enabled Personal Digital Assistants (PDAs), instant messaging devices, mobile e-mail devices and interactive TV devices.

41. The system of claim 27, wherein the client systems comprises a customer relationship management system.

* * * * *